United States Patent
Goel et al.

(10) Patent No.: US 9,292,832 B2
(45) Date of Patent: Mar. 22, 2016

(54) COLLABORATIVE INTELLIGENCE AND DECISION-MAKING IN AN IOT DEVICE GROUP

(71) Applicant: QUALCOMM Incorporated, San Diego, CA (US)

(72) Inventors: Amit Goel, San Diego, CA (US); Mohammed Ataur Rahman Shuman, San Diego, CA (US); Binita Gupta, San Diego, CA (US); Ashutosh Aggarwal, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 14/188,081

(22) Filed: Feb. 24, 2014

(65) Prior Publication Data
US 2014/0244568 A1    Aug. 28, 2014

Related U.S. Application Data

(60) Provisional application No. 61/769,149, filed on Feb. 25, 2013.

(51) Int. Cl.
    *G06N 5/04*      (2006.01)
    *G06Q 10/10*      (2012.01)
    (Continued)

(52) U.S. Cl.
CPC ............ *G06Q 10/101* (2013.01); *H04W 4/005* (2013.01); *H04W 4/08* (2013.01); *H04W 4/206* (2013.01); *G06N 5/04* (2013.01); *H04W 4/008* (2013.01); *H04W 4/023* (2013.01); *H04W 4/028* (2013.01)

(58) Field of Classification Search
None
See application file for complete search history.

(56) References Cited

U.S. PATENT DOCUMENTS

2005/0184852 A1    8/2005    Lee et al.
2005/0273635 A1    12/2005    Wilcox et al.
(Continued)

FOREIGN PATENT DOCUMENTS

WO    2011134318 A1    11/2011
WO    2013123445 A1    8/2013
(Continued)

OTHER PUBLICATIONS

Chihani, et al., Enhancing M2M communication with cloud-based context management, NGMAST '12 : 6th International Conference on Next Generation Mobile Applications, Services and Technologies, Paris : France (2012), pp. 1-6.*
(Continued)

*Primary Examiner* — Wilbert L Starks
(74) *Attorney, Agent, or Firm* — Muncy, Geissler, Olds & Lowe, P.C.

(57) ABSTRACT

The disclosure relates to collaborative intelligence and decision-making in an Internet of Things (IoT) device group. In particular, various IoT devices in the group may be interdependent, whereby a decision that one IoT device plans may impact other IoT devices in the group. Accordingly, in response to an IoT device planning a certain decision (e.g., to transition state or initiate another action), the IoT devices in the group may collaborate using distributed intelligence prior to taking action on the planned decision. For example, a recommendation request may be sent to other IoT devices in the group, which may then analyze relationships within the group to assess potential impacts associated with the planned decision and respond to approve or disapprove the planned decision. Based on the responses received from the other IoT devices, the IoT device may then determine whether to take action on the planned decision.

25 Claims, 12 Drawing Sheets

(51) Int. Cl.
*H04W 4/00* (2009.01)
*H04W 4/08* (2009.01)
*H04W 4/20* (2009.01)
*H04W 4/02* (2009.01)

(56) References Cited

U.S. PATENT DOCUMENTS

| | | |
|---|---|---|
| 2007/0288546 A1 | 12/2007 | Rosenberg |
| 2010/0231506 A1 | 9/2010 | Pryor |
| 2012/0213098 A1 | 8/2012 | Sun |

FOREIGN PATENT DOCUMENTS

| | | | |
|---|---|---|---|
| WO | 2013163202 | A1 | 10/2013 |
| WO | 2013169974 | A1 | 11/2013 |

OTHER PUBLICATIONS

Ketema G., et al., "Efficiently Observing Internet of Things Resources," IEEE International Conference on Green Computing and Communications (GreenCom), Nov. 2012, pp. 446-449.
Zhang Q., et al., "Intelligent Decision-Making Service Framework Based on QoS Model in the Internet of Things," 11th International Symposium on Distributed Computing and Applications to Business, Engineering & Science (DCABES), Oct. 2012, pp. 103-107.
International Search Report and Written Opinion—PCT/US2014/18335—ISA/EPO—Sep. 19, 2014.

* cited by examiner

COLLABORATIVE INTELLIGENCE AND DECISION-MAKING IN AN IOT DEVICE GROUP

CROSS-REFERENCE TO RELATED APPLICATIONS

The present Application for Patent claims the benefit of Provisional Patent Application No. 61/769,149 entitled "COLLABORATIVE INTELLIGENCE AND DECISION-MAKING IN AN IOT DEVICE GROUP," filed Feb. 25, 2013, and assigned to the assignee hereof and hereby expressly incorporated herein by reference in its entirety.

TECHNICAL FIELD

Various embodiments described herein are directed to collaborative intelligence and distributed decision-making in an Internet of Things (IoT) device group.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

The disclosure generally relates to collaborative intelligence and decision-making in an Internet of Things (IoT) device group. In particular, various IoT devices in the group may be interdependent, whereby a decision that one IoT device plans may impact other IoT devices in the group. Accordingly, in response to an IoT device planning a certain decision (e.g., to transition state or initiate another action), the IoT devices in the group may collaborate using distributed intelligence prior to taking action on the planned decision. For example, a recommendation request message may be sent to other IoT devices in the group, which may then analyze relationships within the IoT device group to assess potential impacts associated with the planned decision and respond to approve or disapprove the planned decision. Based on the responses received from the other IoT devices, the IoT device may then appropriately determine whether to take action on the planned decision.

According to one exemplary aspect, IoT devices within the group may follow suitable decision-making algorithms to determine whether to plan certain decisions, transition between certain states, or otherwise initiate certain actions, wherein an IoT device that plans a certain decision may send a recommendation request message indicating the action that the IoT device plans to initiate to other IoT devices in the group prior to actually initiating the action. In one embodiment, the IoT device may then expect the other IoT devices in the group to respond with recommendations in favor or against that decision. For example, each IoT device in the group may maintain a relationship tree that defines various interdependencies with the other IoT devices in the group, wherein a particular IoT device that receives a recommendation request message may check the relationship tree to assess any potential impacts that may result from the decision indicated in the recommendation request message. In one embodiment, each IoT device that receives the recommendation request message may respond with an approval or disapproval message that indicates a degree to which the responding IoT device approves or disapproves the decision indicated in the recommendation request message or alternatively ignore the recommendation request message. In one embodiment, the IoT device that sent the recommendation request message may then analyze any approval or disapproval response messages received from the other IoT devices in the group (e.g., within a reasonable time period) and appropriately determine whether or not to initiate the action indicated in the recommendation request message (e.g., based on an optimization algorithm).

According to another exemplary aspect, IoT devices in the group may send unsolicited recommendations to other IoT devices in the group (e.g., based on a current state). For example, in response to a particular IoT device having a current state that utilizes a certain resource (e.g., a shower IoT device having an in-use state), the IoT device may send an unsolicited recommendation to instruct other IoT devices in the group to not utilize the same resource or take any actions that may adversely impact or otherwise interfere with the current resource utilization state (e.g., do not suddenly change hot or cold water usage in a manner that may adversely impact water temperature in the shower).

According to another exemplary aspect, a method for collaborative decision-making among IoT devices in an IoT group may comprise, among other things, transmitting a recommendation request message to one or more member IoT devices in the IoT group, wherein the recommendation request message indicates a planned state transition (e.g., a state transition planned by an IoT device that transmitted the recommendation request message), receiving one or more responses to the recommendation request message, wherein the one or more responses may include feedback about the planned state transition from the one or more member IoT devices responding to the recommendation request message (e.g., a Boolean value, a fuzzy logic value, or other suitable data to indicate whether the responding member IoT devices approve or disapprove the planned state transition, which may depend on a potential impact determined using a dependency tree that describes relationships among the member IoT devices in the IoT group), and determining whether to initiate the planned state transition based on the one or more responses to the recommendation request message. For example, in one embodiment, the IoT device that transmitted the recommendation request message may aggregate the responses to the recommendation request message until a predefined time period expires and then analyze the responses that are received during the predefined time period to determine whether to initiate the planned state transition (e.g., based on a local decision-making algorithm). Furthermore, in one embodiment, the method may comprise advertising a final decision indicating that the planned state transition will be initiated to the one or more member IoT devices in the IoT group and initiating the planned state transition subsequent to advertising the final decision, or alternatively advertising a final decision indicating that the planned state transition will not be initiated.

According to another exemplary aspect, an apparatus may comprise means for transmitting a recommendation request message to one or more member IoT devices in an IoT group, wherein the recommendation request message indicates a planned state transition, means for receiving one or more responses to the recommendation request message, wherein the one or more responses include feedback about the planned state transition from the one or more member IoT devices responding to the recommendation request message, and means for determining whether to initiate the planned state transition based on the one or more responses to the recommendation request message. For example, in one embodiment, the means for determining whether to initiate the planned state transition may further comprise means for aggregating the responses to the recommendation request message until a predefined time period expires, means for analyzing the responses that are received during the predefined time period to determine whether to initiate the planned state transition, and/or means for planning the state transition based on a local decision-making algorithm. Furthermore, in one embodiment, the apparatus may comprise means for advertising a final decision indicating that the planned state transition will be initiated to the one or more member IoT devices in the IoT group and means for initiating the planned state transition subsequent to advertising the final decision, or alternatively the advertised final decision may indicate that the planned state transition will not be initiated.

According to another exemplary aspect, a computer-readable storage medium may have computer-executable instructions for collaborative group-based decision-making recorded thereon, wherein executing the computer-executable instructions on an IoT device may cause the IoT device to transmit a recommendation request message that indicates a planned state transition to one or more member IoT devices in an IoT group that includes the IoT device, receive one or more responses to the recommendation request message that include feedback about the planned state transition from the member IoT devices responding to the recommendation request message, and determine whether to initiate the planned state transition based on the responses to the recommendation request message.

According to another exemplary aspect, another method for collaborative decision-making among IoT devices in an IoT group may comprise receiving a recommendation request message from at least one member IoT device in the IoT group, wherein the recommendation request message indicates a planned state transition associated with the at least one member IoT device, determining a response to the recommendation request message based at least in part on feedback about the planned state transition (e.g., a Boolean value to indicate whether the planned state transition is approved or disapproved, a fuzzy logic value to indicate a degree to which the planned state transition is approved or disapproved, etc.), and receiving an advertised final decision indicating whether the planned state transition will be initiated from the at least one member IoT device, wherein the at least one member IoT device generates the final decision based at least in part on the feedback about the planned state transition. For example, in one embodiment, determining the response to the recommendation request message may comprise analyzing a potential impact associated with the planned state transition based on a dependency tree that describes relationships among the member IoT devices in the IoT group and determining the response to the recommendation request message based at least in part on the potential impact, wherein the determined response indicates whether the planned state transition is approved or disapproved. Alternatively, in certain use cases, determining the response to the recommendation request message may comprise ignoring the recommendation request message without transmitting the feedback to the at least one member IoT device in response to having no opinion about whether to approve or disapprove the planned state transition and/or designating a proxy member IoT device to determine whether to approve or disapprove the planned state transition and transmit the response to the recommendation request message to the at least one member IoT device.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device, according to various aspects of the disclosure, while

DETAILED DESCRIPTION

Figure 1A:
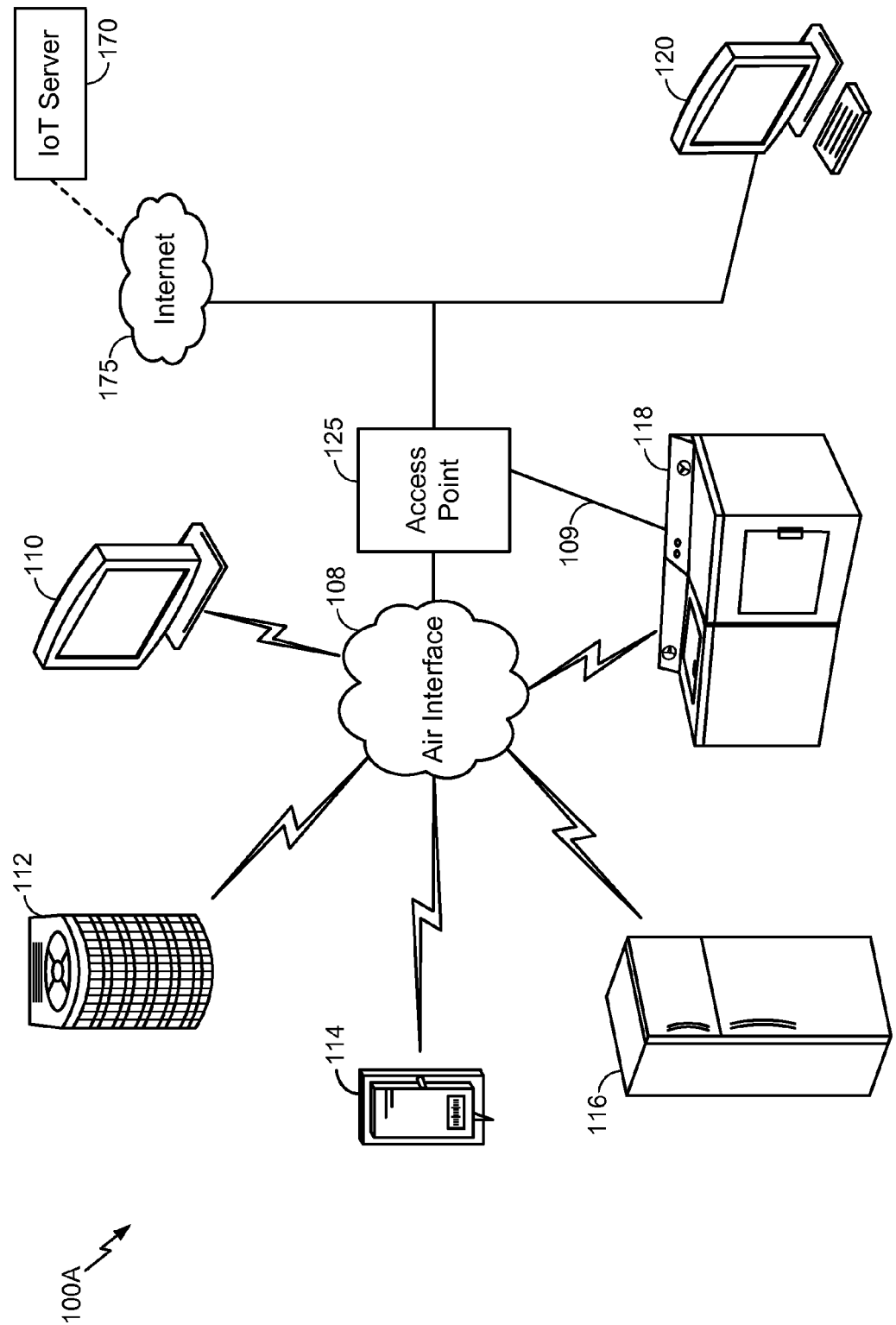
FIGS. 1A-1E illustrates exemplary high-level system architectures of a wireless communications system, according to various aspects of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
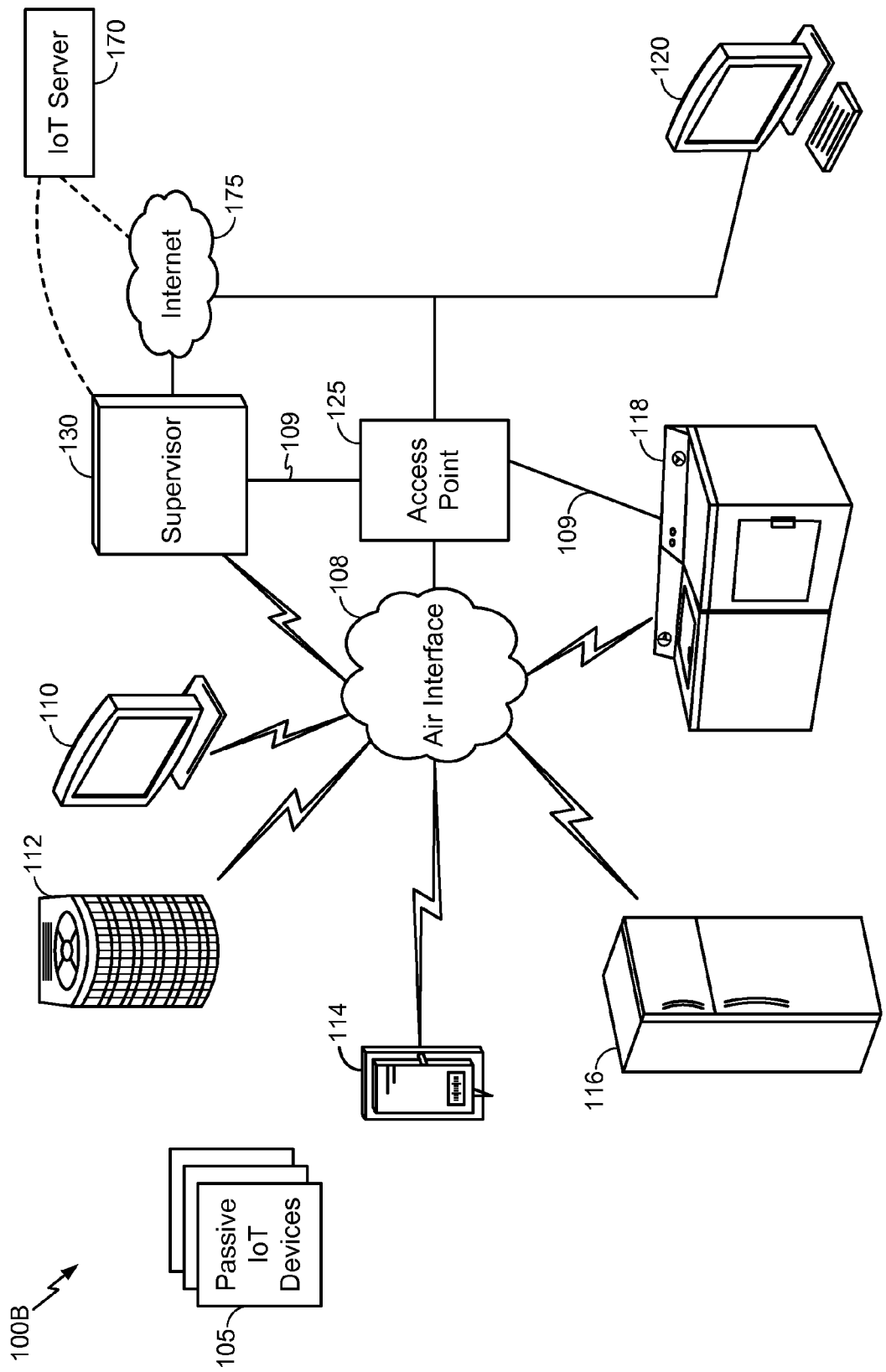

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
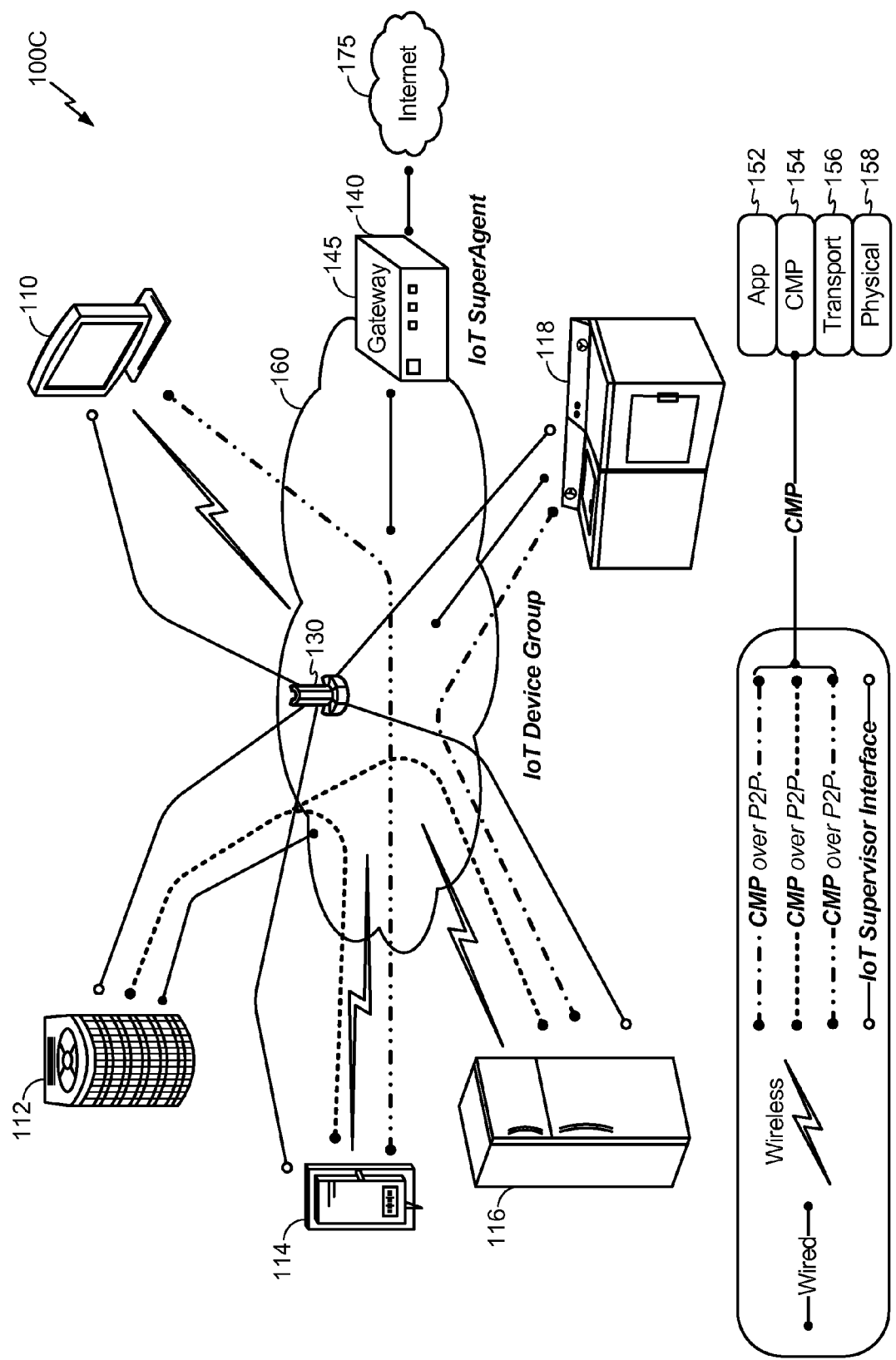

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
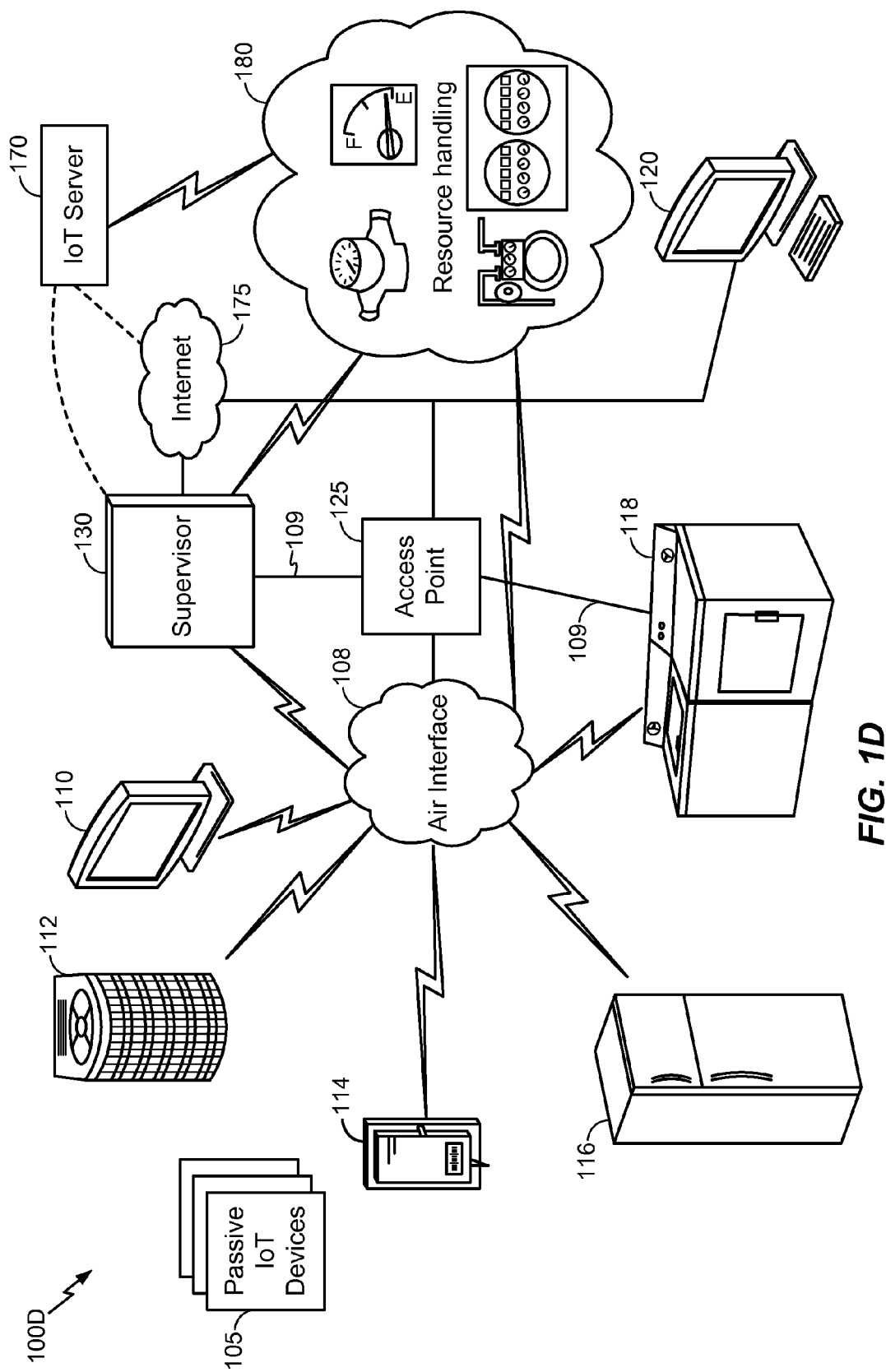

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
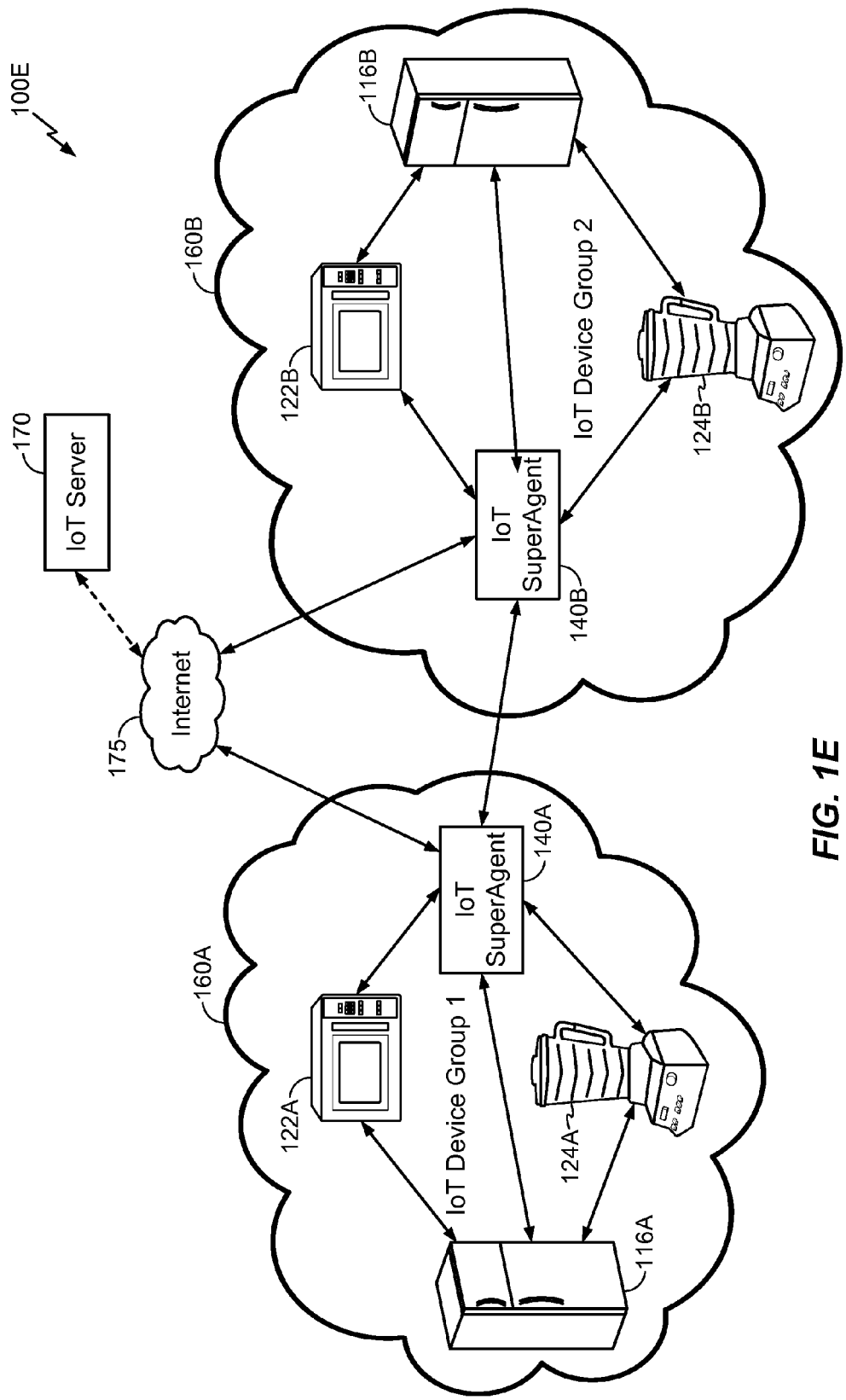

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

In the exemplary wireless communications systems 100A-100E shown in FIGS. 1A-E, respectively, the IoT server 170 and/or the supervisor device 130 may organize the various IoT devices 110-120 and/or the passive IoT devices 105 into one or more small and relevant IoT device groups 160 to enable collaborative intelligence and decision-making within and/or among the IoT device groups 160 (e.g., to control usage associated with various resources 180 that may be shared among the IoT devices 110-120 and/or passive IoT devices 105 in the IoT device groups 169). For example, in one embodiment, the IoT server 170 and/or the supervisor device 130 may provide a distributed network service (e.g., a cloud service) that can represent each IoT device 110-120 and/or passive IoT device 105 in the wireless communications systems 100A-100E with a device-specific globally unique identifier (e.g., a D_GUID) and a group-specific globally unique identifier (e.g., a G_GUID) and further represent each resource 180 shared in the wireless communications systems 100A-100E with a resource-specific globally unique identifier (e.g., a R_GUID). Accordingly, the D_GUIDs, G_GUIDs, and R_GUIDs may be used to control or otherwise coordinate sharing the resources 180 within an IoT device group 160 and/or between different IoT device groups 160.

For example, in the exemplary wireless communications systems 100A-100E shown in FIGS. 1A-E, the IoT server 170 and/or the supervisor device 130 may be provisioned with one or more D_GUIDs that represent the various IoT devices 110-120 and/or passive IoT devices 105. Additionally, in response to a new device powering up or otherwise registering with the IoT server 170 and/or the supervisor device 130 after connecting to the IoT network, a new D_GUID may be allocated to the new device to allow the new device to be reached and various properties may be associated with the D_GUID allocated to the new device (e.g., a description, location, type, etc.). In one embodiment, the IoT server 170 and/or the supervisor device 130 may be further provisioned with R_GUIDs that correspond to resources 180 shared within the IoT network and which devices may need to operate on or otherwise interact with. For example, the resources 180 may generally include water, electricity, sunlight, roads, food, or any other suitable resource 180, which may be uniquely identified within a context according to location, household, or other suitable attributes associated with the resources 180. Furthermore, the IoT server 170 and/or the supervisor device 130 may be provisioned with G_GUIDs that represent each IoT device group 160 that works together (e.g., in a household, a lawn sprinkler, water heater, refrigerator, bathtub, etc. may all operate on shared water resources 180). The G_GUIDs may further include various attributes that define a context associated with the IoT device group 160 (e.g., household, location, owner, etc.) and the resources 180 shared therein. In one embodiment, the IoT server 170 and/or supervisor device 130 may further be provisioned with various policies to define hierarchies, rankings, priorities, or other relationships among the various IoT devices 110-120 and passive IoT devices 105 in addition to the IoT device groups 160 to which they are allocated, the resources 180 shared therein, and any policies to control contending access to the resources 180.

In one embodiment, in response to having suitably provisioned the IoT server 170 and/or the supervisor device 130 with the various D_GUIDs, G_GUIDs, R_GUIDs, and policies, the IoT server 170 and/or the supervisor device 130 may then discover the various IoT device groups 160 and the various resources 180 shared thereby. For example, in one embodiment, an R_GUID may be statically provisioned to or otherwise associated with one or more D_GUIDs that correspond to devices that require access to a certain shared resource 180. In another example, a device that wishes to access a certain shared resource 180 may query the IoT server 170 and/or the supervisor device 130 based on a location, description, or other suitable attributes associated therewith, and the device may then select an appropriate resource 180 from a list that the IoT server 170 and/or the supervisor device 130 returns to the device. Further still, in one embodiment, one or more resources 180 may be tagged with an RFID, bar code, or other suitable data that the IoT devices 110-120 can read in order to dynamically discover the resources 180. Furthermore, in one embodiment, the IoT server 170 and/or the supervisor device 130 may employ a query mechanism to discover the IoT device groups 160 based on context or information input to a suitable user interface (e.g., owners associated with two IoT device groups 160 may exchange G_GUIDs to initiate interaction between the two IoT device groups 160). In another example, based on the permissions, rules, or other policies provisioned to the IoT server 170 and/or the supervisor device 130, two or more IoT device groups 160 can be permanently or temporarily merged to enable the two or more IoT device groups 160 to use the resources shared within each IoT device group.

In one embodiment, in response to having suitably formed the various IoT device groups 160 (e.g., based on various resources 180 shared therein, monitored interactions among the IoT devices 110-120, etc.), the IoT devices 110-120 within the various IoT device groups 160 may communicate with one another in a collaborative manner to make decisions about planned state transitions. In particular, as noted above, the various IoT devices 110-120 in each IoT device group 160 may be interdependent, whereby a decision that one IoT device 110-120 plans may impact other IoT devices 110-120 in the IoT device group 160. Accordingly, in response to an IoT device 110-120 planning a certain decision (e.g., to transition state or initiate another action), the IoT devices 110-120 in the IoT device group 160 may collaborate using distributed intelligence prior to taking action on the planned decision. For example, a recommendation request message may be sent to other IoT devices 110-120 in the IoT device group 160, wherein the other IoT devices 110-120 in the IoT device group 160 may then analyze relationships within the IoT device group 160 to assess potential impacts associated with the planned decision and thereby determine a response to the recommendation request message, wherein the determined response may be transmitted to the IoT device 110-120 that sent the recommendation request message to indicate whether the planned decision is approved or disapproved. Based on the responses to the recommendation request message that are received from the other IoT devices 110-120, the IoT device 110-120 that planned the decision may then appropriately determine whether to initiate or otherwise take action on the planned decision.

In one embodiment, the various IoT devices 110-120 within each IoT device group 160 may follow suitable local decision-making algorithms to determine whether to plan certain decisions, transition between certain states, or otherwise initiate certain actions, wherein an IoT device 110-120 that plans a certain decision may send a recommendation request message indicating the action that the particular IoT device 110-120 plans to initiate to other IoT devices 110-120 in the IoT device group 160 prior to actually initiating the action. In one embodiment, the IoT device 110-120 may then expect the other IoT devices 110-120 in the IoT device group 160 to respond with appropriate recommendations in favor or against that decision. For example, each IoT device 110-120 in the IoT device group 160 may maintain a relationship tree that defines various interdependencies with the other IoT devices 110-120 in the IoT device group 160, wherein a particular IoT device 110-120 that receives a recommendation request message may check the relationship tree to assess any potential impacts that may result from the decision indicated in the recommendation request message. In one embodiment, each IoT device 110-120 that receives the recommendation request message may respond with an approval or disapproval message that indicates a degree to which the responding IoT device 110-120 approves or disapproves the decision indicated in the recommendation request message, or one or more IoT devices 110-120 in the IoT device group 160 may alternatively ignore the recommendation request message. In one embodiment, the IoT device 110-120 that sent the recommendation request message may then analyze any approval or disapproval response messages received from the other IoT devices 110-120 in the IoT device group 160 (e.g., within a reasonable time period) and appropriately determine whether or not to initiate the action indicated in the recommendation request message.

Furthermore, in one embodiment, IoT devices 110-120 in the IoT device group 160 may send unsolicited recommendations to other IoT devices 110-120 in the IoT device group 160 (e.g., based on a current state). For example, in response to a particular IoT device 110-120 having a current state that utilizes a certain resource 180 (e.g., a shower IoT device having an in-use state), the IoT device 110-120 may send an unsolicited recommendation to instruct other IoT devices 110-120 in the IoT device group 160 to not utilize the same resource 180 or take any actions that may adversely impact or otherwise interfere with the current utilization state associated with the resource 180 (e.g., do not suddenly change hot or cold water usage in a manner that may adversely impact water temperature in the shower).

Figure 2A:
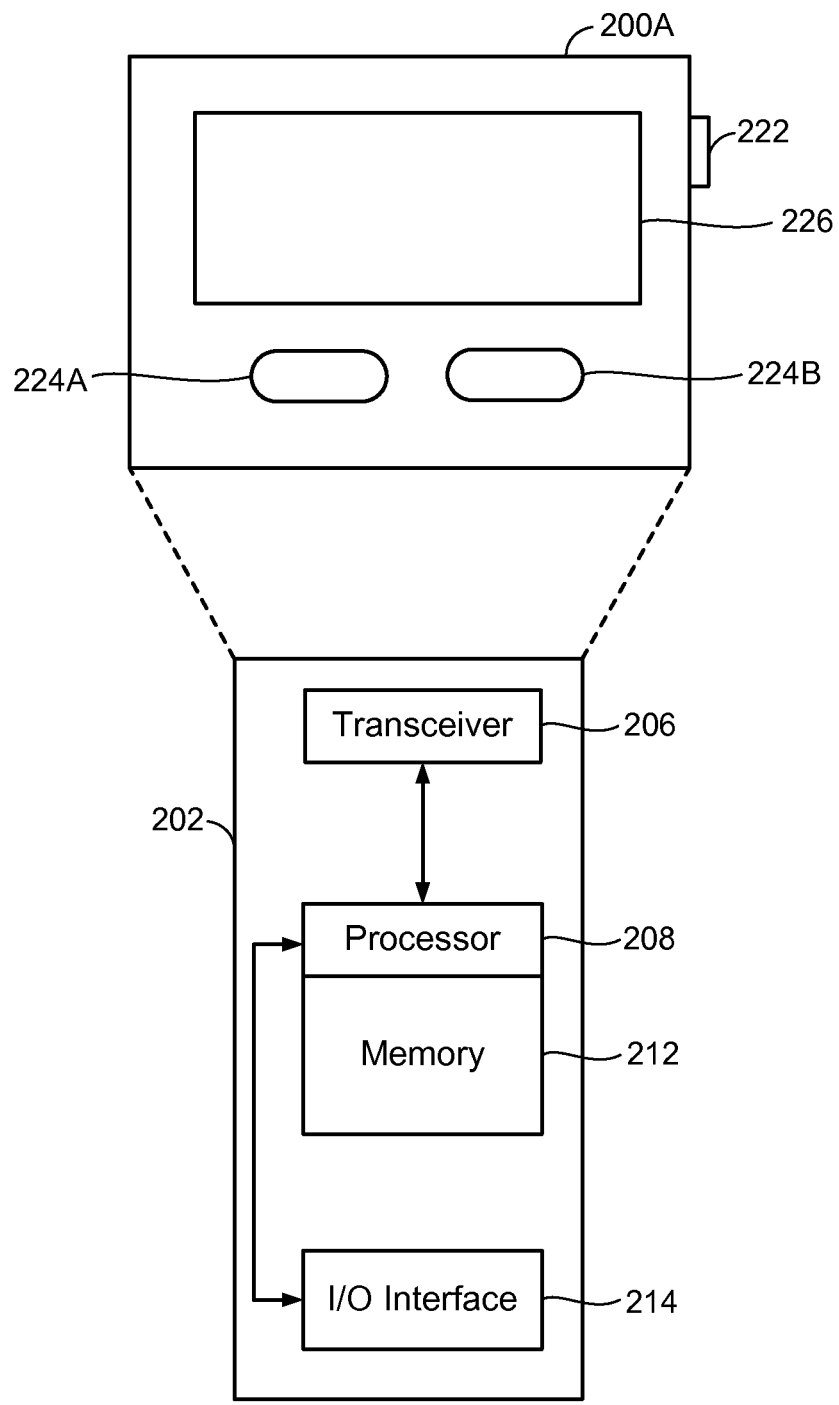

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
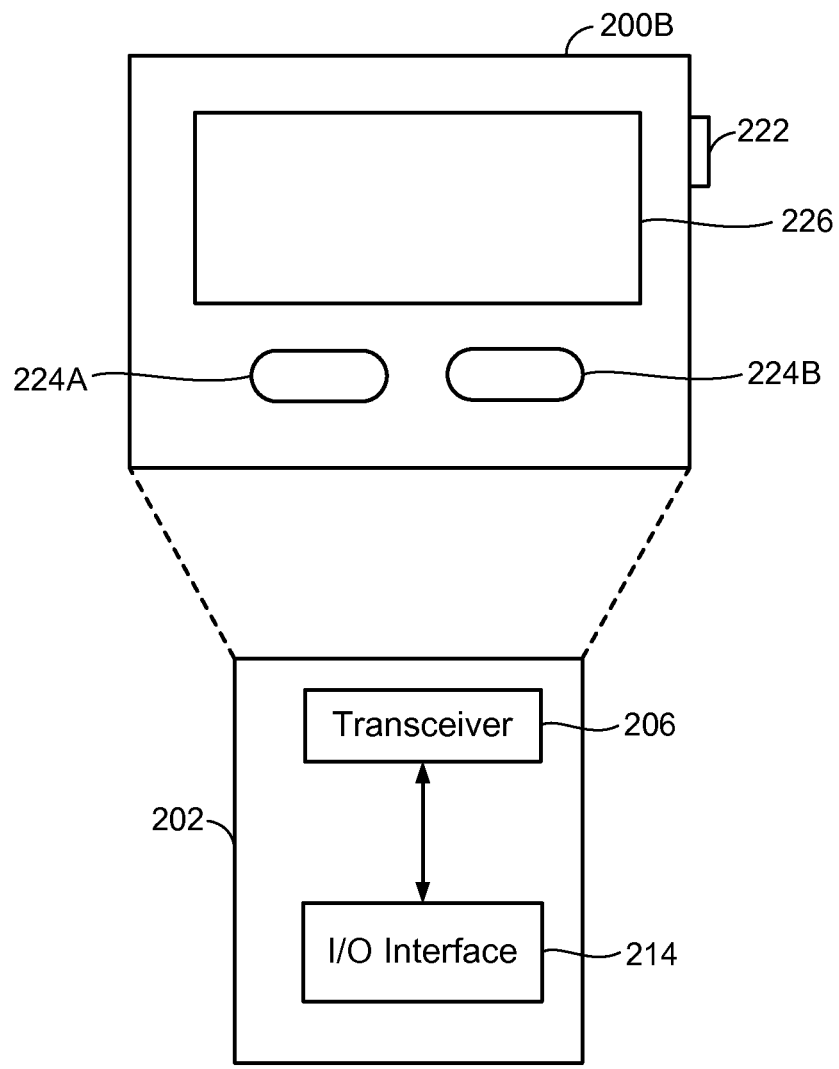
FIG. 2B illustrates an exemplary passive IoT device, according to various aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
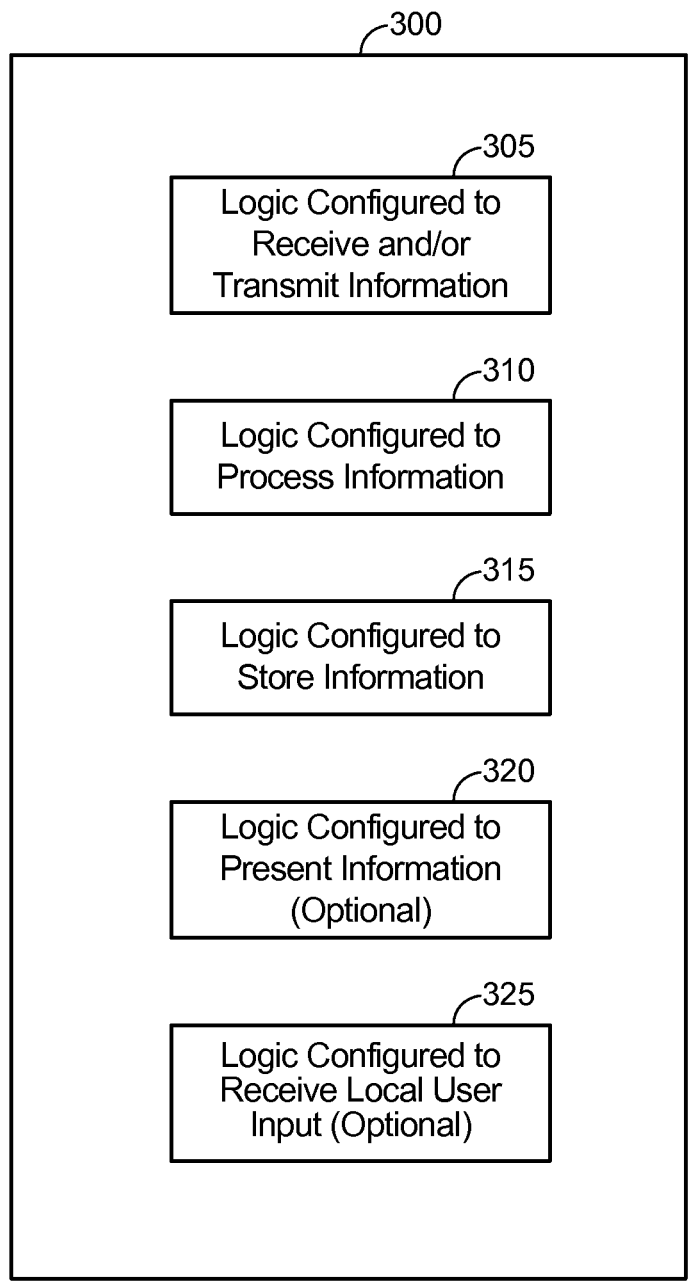
FIG. 3 illustrates an exemplary communication device that includes logic configured to perform functionality, according to various aspects of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
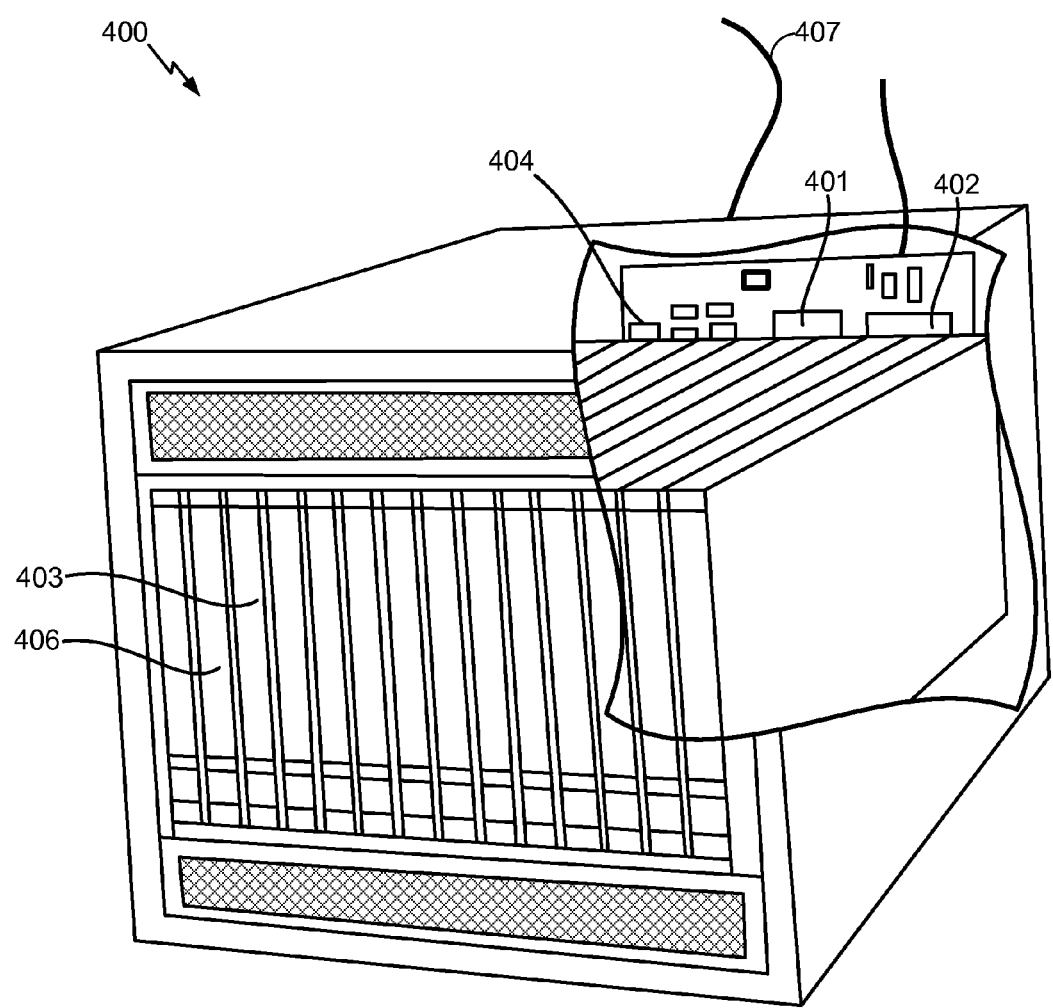
FIG. 4 illustrates an exemplary server, according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

IP based technologies and services have become more mature, driving down the cost and increasing availability of IP. This has allowed Internet connectivity to be added to more and more types of everyday electronic objects. The IoT is based on the idea that everyday electronic objects, not just computers and computer networks, can be readable, recognizable, locatable, addressable, and controllable via the Internet. In general, with the development and increasing prevalence of the IoT, numerous heterogeneous IoT devices that perform different activities and need to interact with one another in many different ways may be in use in homes, workplaces, cars, shopping centers, and various other locations. As such, due to the potentially large number of heterogeneous IoT devices that may be in use, direct communication among individual IoT devices may be inefficient or insufficient to meet user demands and needs. Accordingly, as will be described in further detail below with reference to FIG. 5, various IoT devices may be organized or otherwise formed into groups to enable different IoT devices to work together more efficiently, optimize communication among different IoT devices, and improve effectiveness and overall user experience.

More particularly, in one embodiment, an exemplary method 500 for forming IoT device groups and enabling communication among IoT device groups may include defining various criteria to form the IoT device groups at block 510, wherein the IoT group criteria defined at block 510 may include appropriate criteria to rank members within a particular IoT group, provisioning mechanisms to allocate IoT devices to certain groups, or other suitable group criteria. For example, in one embodiment, the criteria defined at block 510 may define certain activities or contexts that may be the same, substantially similar, or otherwise related among various different IoT devices (e.g., dishwashers, showers, bathtubs, hot water heaters, washing machines, etc. may all utilize hot water, while televisions, Blu-ray players, DVRs, etc. may all be considered media devices, etc.). Furthermore, in one embodiment, the criteria defined at block 510 may define certain dynamic contexts that may be limited in scope, duration, location, or otherwise (e.g., dishwashers, showers, bathtubs, hot water heaters, washing machines, etc. may all utilize hot water but only actually use hot water at certain times).

In one embodiment, in response to suitably defining the IoT device grouping criteria at block 510, one or more pre-defined IoT device groups may be formed based on static criteria at block 520. For example, in one embodiment, one or more IoT devices that perform the same or substantially similar activities, utilize the same or substantially similar resources, or otherwise have certain permanently common characteristics may be persistently allocated to the pre-defined IoT device groups at block 520 to enable communication among all IoT devices that have the permanently common characteristics. Further, in one embodiment, certain IoT devices may be dynamically allocated to one or more ad-hoc IoT device groups at block 530 to the extent that such IoT devices may perform the same or substantially similar activities in certain limited contexts, utilize the same or substantially similar resources in certain limited contexts, or otherwise have certain temporarily common characteristics. Accordingly, a determination may be made as to whether one or more dynamic IoT device group formation criteria have been satisfied, wherein one or more IoT devices may be dynamically allocated to one or more ad-hoc IoT device groups at block 530 in response to determining that the dynamic IoT device group formation criteria have been satisfied. For example, the ad-hoc IoT device groups formed at block 530 may be defined to last a certain time, encompass IoT devices in certain locations, or encompass IoT devices that otherwise share a context based on current status (e.g., during owner presence, IoT devices using certain resources such as all the IoT devices using hot water may be automatically made part of a hot water group, IoT devices having a particular operating state such as all IoT devices that are currently active may be made part of a busy group, etc.). Accordingly, the members within the various pre-defined IoT device groups and/or ad-hoc IoT device groups may generally be allocated based on suitable static and/or dynamic criteria, respectively. Among other advantages, grouping IoT devices into the pre-defined and ad-hoc groups can enable a particular IoT device to send a message to a particular pre-defined or ad-hoc group without having to know the members within the group. For example, in one embodiment, an energy meter IoT device can send a command to an ad-hoc "idle" IoT device group to enter an offline state in response to receiving an appropriate signal from a power grid.

In one embodiment, in response to suitably forming the pre-defined IoT device groups at block 520 and/or any ad-hoc IoT device groups that satisfy the dynamic group formation criteria at block 530, one or more hierarchies associated with the formed IoT device groups may be defined at block 540. For example, in one embodiment, the hierarchies defined at block 540 may designate a particular IoT device in each group as the owner or manager associated therewith. In another example, the hierarchies defined at block 540 may rank the IoT devices in each group (e.g., according to the manner in which the various grouped IoT devices interact with one another, perform common or otherwise similar activities, have dependent relationships, etc.).

In one embodiment, the hierarchies defined at block 540 may then be used to enable communication among the various pre-defined and/or ad-hoc IoT device groups at block 550. For example, in one embodiment, block 550 may enable communication in a manner whereby only the group owners or managers associated with multiple IoT device groups (or certain IoT device groups) communicate with one another. In this manner, the IoT device group owners or managers may relay messages to and from member IoT devices such that the only inter-group communication occurs between the group owners or managers (e.g., an originator IoT device can send a message to an address associated with a target IoT group, wherein based on rankings or other hierarchies within the target IoT group, a ranking manager, owner, server, or other member therein can send the message to other members based on rankings or other hierarchical criteria). In another example, hierarchical group communication may be enabled at block 550, wherein certain messages that are directed to certain IoT devices among all the IoT devices in a particular group may be targeted to one or more ranking members in the group (e.g., a message to record a particular television program may be directed to a master DVR in a multi-room DVR system where certain set-top boxes in satellite rooms stream content recorded on the master DVR). In another example, all IoT devices in a home that are currently using hot water may be dynamically allocated to an ad-hoc hot water IoT device group, whereby any IoT device that wants to communicate with the IoT devices in the ad-hoc hot water group can address the group (e.g., via a message to the group owner or manager) without needing to know or otherwise identify the individual IoT member devices. Furthermore, in one embodiment, the IoT group communication enabled at block 550 may comprise peer-to-peer communication. In particular, the peer-to-peer IoT group communication may enable an originating IoT device to ping a manager IoT device within a target IoT group to find the members associated with the target IoT group. As such, the originating IoT device may then communicate with members in the target IoT group peer-to-peer.

In one embodiment, in response to suitably forming the IoT device groups, defining the hierarchies associated with the IoT device groups, and enabling communication among the IoT device groups, the method 500 may return to blocks 520 and 530 to manage the IoT device groups. For example, certain IoT member devices may be dynamically allocated or removed from one or more ad-hoc IoT device groups at block 530 in response to changes in status associated therewith. In another example, a certain IoT device that an owner no longer uses may be removed from any pre-defined IoT device group or ad-hoc IoT device group in which the IoT device was a member at block 520. Furthermore, in one embodiment, a new IoT device may be added to one or more pre-defined IoT device groups upon initialization at block 520 and/or ad-hoc IoT device groups at block 530 based on a current status and/or subsequent changes in status. For example, a new refrigerator IoT device may join a pre-defined IoT group that includes every IoT device in a network upon initialization and join a closed refrigerator IoT group in a neighborhood that can send consolidated orders to a grocery store. In another example, a local neighborhood may include a closed sprinkler controller IoT device group that can share weather information and coordinate operational times (e.g., the group owner or another suitable ranking member in the sprinkler controller IoT device group may subscribe to weather forecasts and inform all other members in the group about upcoming weather forecasts to coordinate when and/or how long the sprinklers should enter an operational state). In still another example, a bathtub IoT device may notify an ad-hoc hot water group that water will be required for a certain time period (e.g., the next 15 minutes or until the bathtub has filled), or the bathtub may appropriately join the ad-hoc hot water group for the time period during which hot water will be required.

Figure 5:
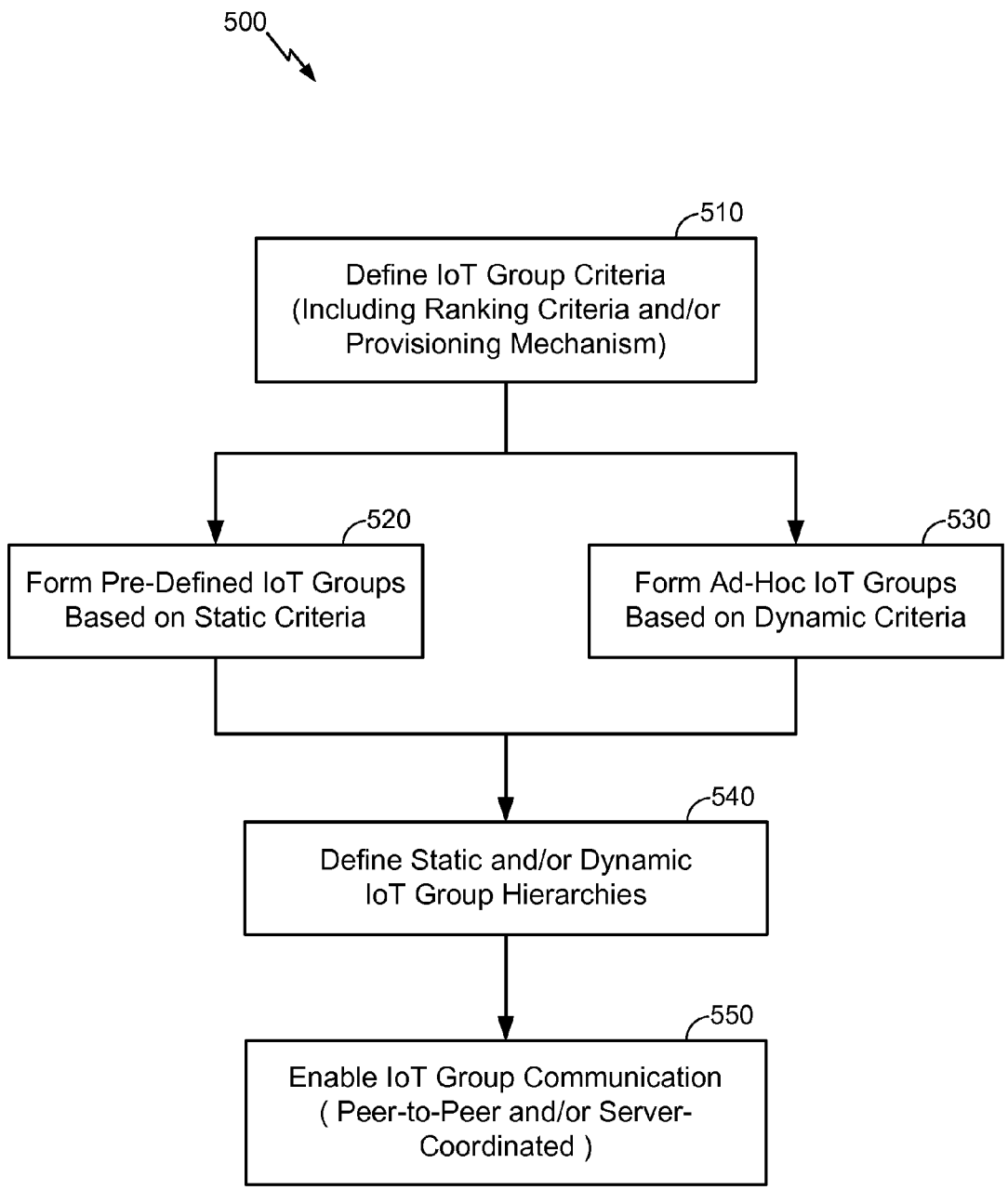
FIG. 5 illustrates an exemplary method for forming IoT device groups, according to various aspects of the disclosure.

Accordingly, the method 500 shown in FIG. 5 and described in further detail above may generally be used on a server or other suitable management entity to provision and discover IoT devices, IoT device groups, and resources shared among and between the IoT devices and/or IoT device groups. More particularly, the method 500 may be performed to organize various IoT devices and/or passive IoT devices into one or more small and relevant IoT device groups, wherein the various IoT devices and/or passive IoT devices organized into the IoT device groups may then communicate with one another to exchange information about planned state transitions or other suitable decisions in order to make decisions in a collaborative and intelligent manner. For example, in one embodiment, the server may provide a distributed network service (e.g., a cloud service) that can represent each IoT device and/or passive IoT device with a device-specific globally unique identifier (e.g., a D_GUID), each IoT device group with a group-specific globally unique identifier (e.g., a G_GUID), and each shared resource with a resource-specific globally unique identifier (e.g., a R_GUID). Accordingly, the D_GUIDs, G_GUIDs, and R_GUIDs may be used to control or otherwise coordinate sharing the resources within an IoT device group and/or between different IoT device groups. In particular, the server may define permissions, rules, or other suitable policies that may be used to determine whether a particular device can access a shared resource, enable different IoT device groups to interact with each other and access resources in different IoT device groups, and regulate the usage associated with the resources.

For example, in one embodiment, the server may carry out the method 500 to provision one or more D_GUIDs that represent the various IoT devices and/or passive IoT devices. Additionally, in response to a new device powering up or otherwise registering with the server after connecting to the IoT network, a new D_GUID may be allocated to the new device to allow the new device to be reached and various properties may be associated with the D_GUID allocated to the new device (e.g., a description, location, type, etc.). In one embodiment, the server may further provision R_GUIDs that correspond to resources shared within the IoT network on which devices may need to operate or with which the device may otherwise need to interact. For example, the resources may generally include water, electricity, sunlight, roads, food, or any other suitable resource, which may be uniquely identified within a context according to location, household, or other suitable attributes associated with the resources. Furthermore, the server may provision G_GUIDs that represent each IoT device group that works together (e.g., in a household, a lawn sprinkler, water heater, refrigerator, bathtub, etc. may all operate on shared water resources). The G_GUIDs may further include various attributes that define a context associated with the IoT device group (e.g., household, location, owner, etc.) and the resources shared therein. In one embodiment, the server may further be provisioned with various policies to define hierarchies, rankings, priorities, or other relationships among the various IoT devices and passive IoT devices in addition to the IoT device groups to which they are allocated, the resources shared therein, and any policies to control contending access to the resources, which may then be used in the IoT device groups to enable collaborative and intelligent decision-making, as described in further detail herein.

Figure 6:
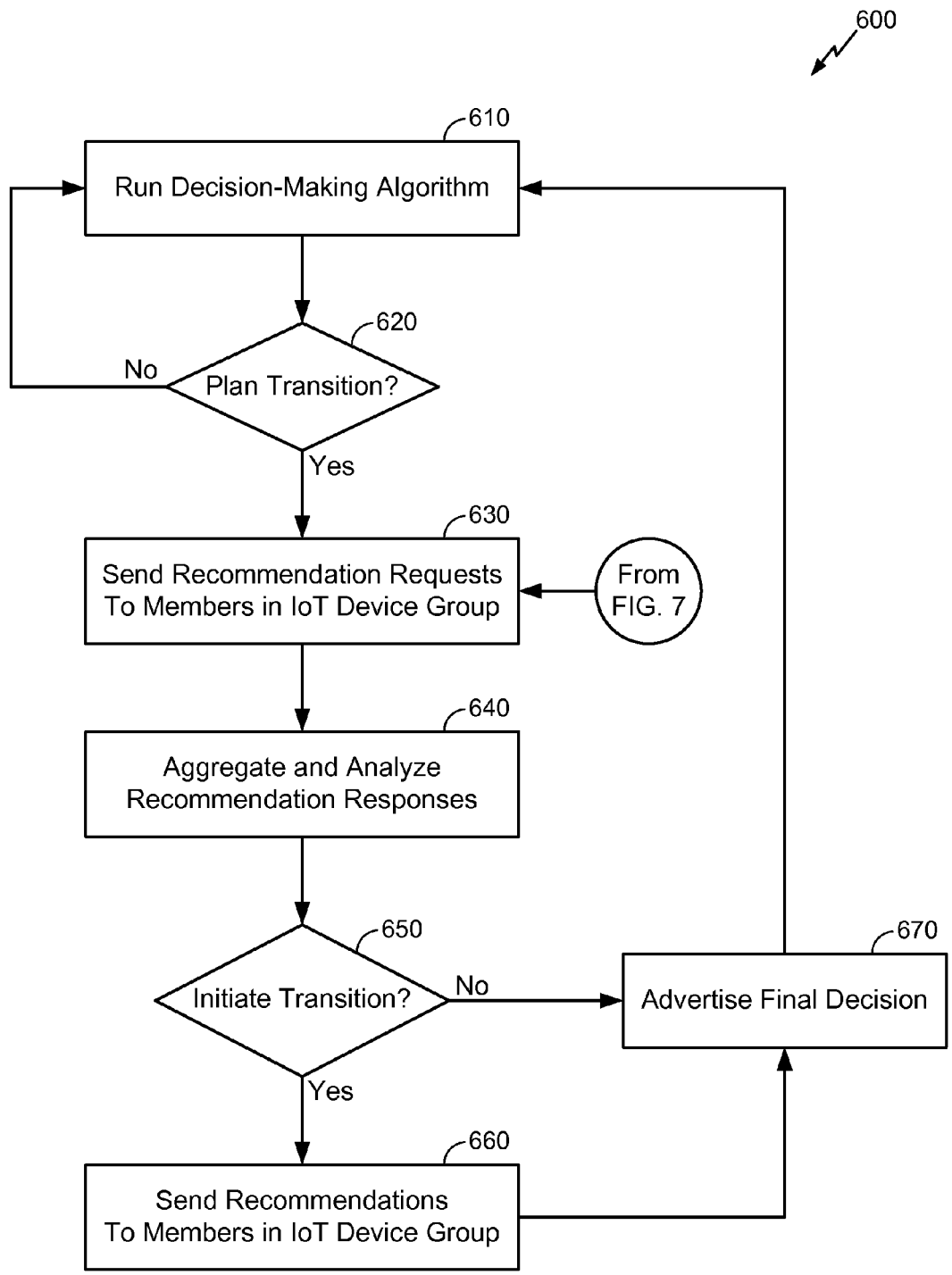
FIG. 6 illustrates an exemplary method for using collaborative intelligence and decision-making in an IoT device group, according to various aspects of the disclosure.

According to various aspects of the disclosure, FIG. 6 illustrates an exemplary method 600 for using collaborative intelligence and decision-making in an IoT device group, which may be formed according to the method 500 shown in FIG. 5 and/or any other suitable methodology. In particular, as noted above, the IoT device group may organize or otherwise various interdependent IoT devices that can then use collaborative intelligence and decision-making to determine whether or not a particular IoT device in the group may take action on a planned decision. For example, because the various IoT devices in the IoT device group are interdependent, a decision that one IoT device within the group plans may potentially impact other IoT devices in the group in an adverse or beneficial manner. Accordingly, in response to a particular IoT device in the group planning a certain decision (e.g., to transition state or initiate a certain action), the various IoT devices in the group may collaborate using distributed intelligence prior to the IoT device that planned the decision taking any action thereon. For example, the IoT device that planned the decision may send a recommendation request message to other IoT devices in the group, which may then analyze relationships within the IoT device group to assess potential impacts associated with the planned decision. The other IoT devices in the group may then respond with a message that approves or disapproves the planned decision, wherein the planning IoT device may then appropriately determine whether to take action on the decision based on any responses received from the other IoT devices. For example, in one embodiment, the message that approves or disapproves the planned decision may be a Boolean response (e.g., a "Yes" or logical '1' to approve the planned decision or a "No" or logical '0' to disapprove the planned decision), a fuzzy logic response (e.g., a decimal value in a range than spans [0:1], [−1:+1], or another suitable range, a percentage approval value, etc.), or any other suitable response that may indicate whether and/or the degree or extent to which the responding IoT device approves or disapproves the planned decision indicated in the recommendation request message.

Accordingly, in the method 600 shown in FIG. 6, each IoT device in the group may be configured or otherwise programmed with an appropriate decision-making algorithm that the respective IoT device may follow to determine whether to plan a certain transition in state or other action based on a decision made using the decision-making algorithm. As such, in one embodiment, any suitable IoT device in the IoT device group may run the decision-making algorithm associated therewith at block 610 and determine whether to plan a certain transition (e.g., changing a state, initiating an action, etc.) at block 620. For example, in one embodiment, a printer IoT device may run a decision-making algorithm at block 610 to determine whether or not to enter a hibernation mode, sleep mode, or other low-power state depending on usage associated with the printer IoT device. Based on the decision-making algorithm that the printer IoT device runs at block 610, the printer IoT device may then determine whether to plan a transition to the low-power state at block 620 (e.g., the printer IoT device may plan the transition to the low-power state in response to determining that the printer IoT device has not been used for 15 minutes or another suitable time period or alternatively not plan the transition to the low-power state in response to determining that the printer IoT device has been used within the defined time period).

In one embodiment, in response to the IoT device determining at block 620 that one or more criteria or other conditions to trigger the planned transition have not been satisfied, the IoT device may continue to run the decision-making algorithm at block 610 until the criteria or other conditions to trigger the planned transition have satisfied. Alternatively, in response to determining that the criteria or other conditions to trigger the planned transition have been satisfied at block 620, the IoT device may send a recommendation request message to other IoT member devices in the IoT device group at block 630 prior to actually taking any action or otherwise making the planned transition. In one embodiment, the recommendation request message that the IoT device sends to other members in the IoT device group at block 630 may generally indicate the action or transition that the IoT device plans to initiate and the IoT device may then expect the IoT member devices in the group to respond to the recommendation request message with appropriate responses that include recommendations in favor or against that decision.

For example, in one embodiment, each IoT member device in the group may maintain a relationship tree that defines interdependencies with other IoT devices in the group. As such, in response to a particular IoT member device in the IoT device group receiving the recommendation request message sent at block 630, the receiving IoT device may check the interdependencies defined in the relationship tree to assess any potential impacts that may result from the planned transition indicated in the recommendation request message. In one embodiment, each IoT device that receives the recommendation request message may then respond with an approval or disapproval message. Furthermore, in one embodiment, the approval or disapproval message may indicate a degree to which the responding IoT device approves or disapproves the planned decision indicated in the recommendation request message (e.g., according to a fuzzy logic measure such as a decimal value in a range than spans [0:1], [−1:+1], or another suitable range, according to a confidence measure such as a percentage approval or disapproval value, according to a predefined scale that indicates "strong approval," "slight approval," "slight disapproval," "strong disapproval," etc., or according to any other suitable scheme that may indicate whether and/or the degree or extent to which the responding IoT device approves or disapproves the planned decision). In another embodiment, the approval or disapproval message may indicate approval or disapproval in Boolean or binary terms (e.g., a "Yes" or logical '1' to approve the planned decision or a "No" or logical '0' to disapprove the planned decision).

Moreover, in one embodiment, any particular IoT device that receives the recommendation request message may simply ignore the recommendation request message. For example, in one embodiment, a particular IoT device that receives the recommendation request message may ignore the recommendation request message sent at block 630 if the IoT device has no opinion regarding whether or not to approve or disapprove the planned transition. Additionally, in one embodiment, one or more IoT devices may proxy recommendations on behalf of another IoT device and therefore respond to the recommendation request message sent at block 630 with an approval or disapproval message of behalf of the other IoT device. More particularly, a particular IoT device may designate another IoT device to proxy recommendations on its behalf based on a current or planned state associated therewith (e.g., prior to entering a particular state, in response to entering a particular state, etc.), whereby the designated proxy IoT device may then respond to any recommendation request messages sent to or otherwise directed towards the IoT device that designated the other IoT device to proxy recommendations on its behalf. For example, in one embodiment, a refrigerator IoT device that needs to power off to allow maintenance to occur in the next hour can designate another IoT device for proxy. As such, if a third IoT device (e.g., a washer IoT device) sends a recommendation request message that indicates a planned transition to employ cold water, the designated proxy IoT device can respond on behalf of the refrigerator IoT device to discourage the consumption of large quantities of cold water while the refrigerator IoT device remains powered off.

In one embodiment, the IoT device that sent the recommendation request message may then aggregate and analyze any approval or disapproval response messages that may have been received from the other IoT devices in the group at block 640. For example, in one embodiment, the IoT device may define a suitable time period within which the other IoT devices may respond to the recommendation request message and aggregate and analyze any responses received from the other IoT devices before the defined time period expires. In this manner, the IoT device that sent the recommendation request message may analyze the approval or disapproval response messages without having to wait until all IoT member devices have responded and thereby tolerate situations in which one or more IoT member devices ignore the recommendation request message. In another embodiment, if approval or disapproval response messages and/or messages indicating that the recommendation request message was ignored are received from all IoT member devices prior to the defined time period expiring, the IoT device may aggregate and analyze the approval or disapproval response messages that were received without waiting until the time period expires. However, those skilled in the art will appreciate that other techniques may be used to allow IoT member devices to appropriately respond to the recommendation request message (e.g., the IoT device planning the transition may wait until the time period expires even if all IoT member devices respond sooner to allow certain IoT member devices to change their recommendations or the degrees to which the planned transition may be approved or disapproved based on state changes associated with the IoT member devices, resources utilized therewith or within the IoT device group, etc.).

In one embodiment, in response to suitably aggregating and analyzing the approval or disapproval response messages, the IoT device planning the transition may appropriately determine whether or not to initiate the action indicated in the recommendation request message (e.g., based on an optimization algorithm) at block 650. In one embodiment, the IoT device may then advertise the final decision to indicate whether or not the planned transition was or will be initiated at block 670 such that the other IoT member devices may know the expected state associated with the IoT device, any changes in resource utilization that result from the IoT device making the transition or deciding to not make the transition, etc.

Figure 7:
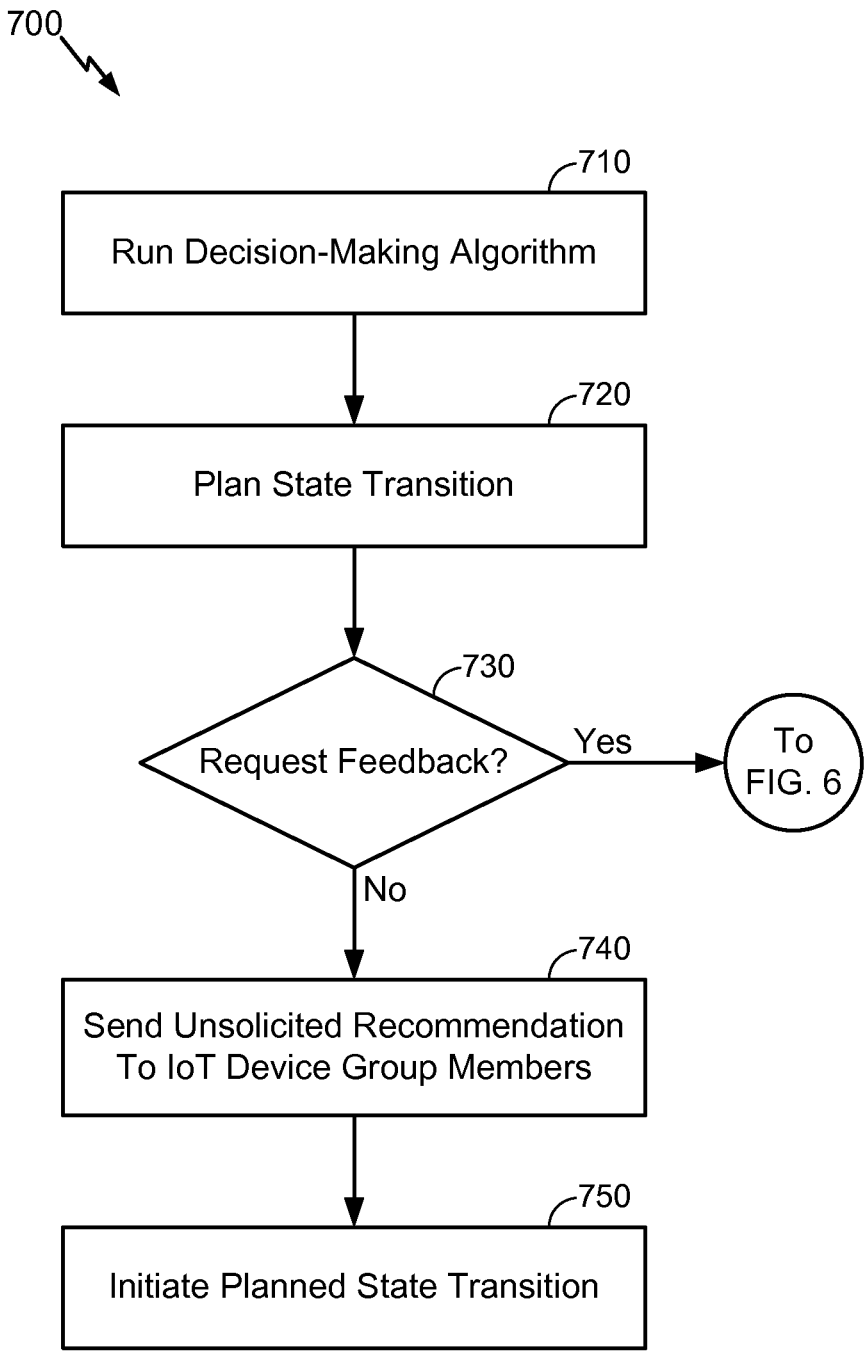
FIG. 7 illustrates an exemplary method for using collaborative intelligence and decision-making in an IoT device group, according to various aspects of the disclosure.

According to various aspects of the disclosure, FIG. 7 illustrates another method 700 for using collaborative intelligence and decision-making in an IoT device group, which may be formed according to the method 500 shown in FIG. 5 and/or other suitable methodologies. In particular, the method 700 shown in FIG. 7 may have similar characteristics to the method 600 shown in FIG. 6 and described in further detail above, wherein each IoT device in an IoT device group may be configured or otherwise programmed with an appropriate local decision-making algorithm that the respective IoT device may run at block 710 to determine whether to plan a certain state transition or other action based on the local decision-making algorithm. However, the method 700 shown in FIG. 7 may differ from the method 600 shown in FIG. 6 in that an IoT device that plans a state transition at block 720 based on the local decision-making algorithm may further determine whether to request feedback from the other IoT devices in the IoT device group at block 730.

In one embodiment, in response to block 730 resulting in the IoT device that planned the state transition determining that feedback may be needed from the other IoT devices in the IoT device group, the IoT device may then send recommendation request messages to the other IoT devices in the group according to a substantially similar methodology to that described above with reference to FIG. 6 (e.g., returning to block 630 and then determining whether to initiate the planned transition based on the responses that include feedback from the other IoT devices in the group about the decision indicated in the recommendation request message).

Alternatively, in response to block 730 resulting in a determination that feedback may not be needed from the other IoT devices in the IoT device group, the IoT device that planned the state transition may send one or more unsolicited recommendations to the other IoT member devices at block 740 and autonomously initiate the planned state transition at block 750. For example, in response to the IoT device planning a transition to a state that will utilize a certain resource (e.g., a shower IoT device having an in-use state), the IoT device may send an unsolicited recommendation at block 740 to instruct other IoT member devices in the group to not utilize the same resource or take any actions that may adversely impact or otherwise interfere with the resource utilization in the state to which the IoT device may have transitioned (e.g., do not suddenly change hot or cold water usage in a manner that may adversely impact water temperature in the shower). Furthermore, those skilled in the art will appreciate that the unsolicited recommendations may be sent to other IoT member devices at block 740 independently from the collaborative decision-making processes described above (e.g., certain decisions may be permitted without requiring collaborative decision-making, in which case the unsolicited recommendations may be sent at block 740 to inform the other IoT member devices about the current state associated with the IoT devices in the group and the resources available thereto in order to inform how each IoT member devices uses the respective decision-making algorithms to plan certain transitions or other actions).

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for collaborative decision-making among Internet of Things (IoT) devices in an IoT group, comprising:
    transmitting a recommendation request message to one or more member IoT devices in the IoT group, wherein the recommendation request message indicates a planned state transition;
    receiving one or more responses to the recommendation request message, wherein the one or more responses include feedback about the planned state transition from the one or more member IoT devices responding to the recommendation request message; and
    determining whether to initiate the planned state transition based on the one or more responses to the recommendation request message.

2. The method recited in claim 1, further comprising:
    aggregating the responses to the recommendation request message until a predefined time period expires and analyzing the responses that are received during the predefined time period to determine whether to initiate the planned state transition.

3. The method recited in claim 1, further comprising:
    planning the state transition based on a local decision-making algorithm.

4. The method recited in claim 1, wherein the one or more responses to the recommendation request message include a Boolean value to indicate whether the responding member IoT devices approve or disapprove the planned state transition.

5. The method recited in claim 1, wherein the one or more responses to the recommendation request message include a fuzzy logic value to indicate a degree to which the responding member IoT devices approve or disapprove the planned state transition.

6. The method recited in claim 1, wherein the one or more member IoT devices analyze a potential impact associated with the planned state transition based on a dependency tree that describes relationships among the member IoT devices in the IoT group and determine whether to approve or disapprove the planned state transition based on the potential impact.

7. The method recited in claim 6, wherein at least one member IoT device in the IoT group ignores the recommendation request message in response to having no opinion about whether to approve or disapprove the planned state transition.

8. The method recited in claim 6, wherein at least one member IoT device in the IoT group designates a proxy member IoT device that determines whether to approve or disapprove the planned state transition on behalf of the at least one member IoT device.

9. The method recited in claim 1, further comprising:
advertising a final decision indicating that the planned state transition will be initiated to the one or more member IoT devices in the IoT group; and
initiating the planned state transition subsequent to advertising the final decision.

10. The method recited in claim 1, further comprising:
advertising a final decision indicating that the planned state transition will not be initiated to the one or more member IoT devices in the IoT group.

11. The method recited in claim 10, further comprising:
receiving an unsolicited recommendation from at least one member IoT device in the IoT group, wherein the unsolicited recommendation indicates an operational state associated with the at least one member IoT device; and
deciding to not initiate the planned state transition in response to determining that the planned state transition has a potential adverse impact on the operational state associated with the at least one member IoT device that sent the unsolicited recommendation.

12. An apparatus, comprising:
means for transmitting a recommendation request message to one or more member Internet of Things (IoT) devices in an IoT group, wherein the recommendation request message indicates a planned state transition;
means for receiving one or more responses to the recommendation request message, wherein the one or more responses include feedback about the planned state transition from the one or more member IoT devices responding to the recommendation request message; and
means for determining whether to initiate the planned state transition based on the one or more responses to the recommendation request message.

13. The apparatus recited in claim 12, wherein the means for determining whether to initiate the planned state transition further comprises:
means for aggregating the responses to the recommendation request message until a predefined time period expires; and
means for analyzing the responses that are received during the predefined time period to determine whether to initiate the planned state transition.

14. The apparatus recited in claim 12, wherein the means for determining whether to initiate the planned state transition further comprises means for planning the state transition based on a local decision-making algorithm.

15. The apparatus recited in claim 12, further comprising:
means for advertising a final decision indicating that the planned state transition will be initiated to the one or more member IoT devices in the IoT group; and
means for initiating the planned state transition subsequent to advertising the final decision.

16. The apparatus recited in claim 12, further comprising:
means for advertising a final decision indicating that the planned state transition will not be initiated to the one or more member IoT devices in the IoT group.

17. The apparatus recited in claim 12, further comprising:
means for receiving an unsolicited recommendation from at least one member IoT device in the IoT group, wherein the unsolicited recommendation indicates an operational state associated with the at least one member IoT device; and
means for deciding to not initiate the planned state transition in response to determining that the planned state transition has a potential adverse impact on the operational state associated with the at least one member IoT device that sent the unsolicited recommendation.

18. A computer-readable storage medium having computer-executable instructions for collaborative group-based decision-making recorded thereon, wherein executing the computer-executable instructions on an Internet of Things (IoT) device causes the IoT device to:
transmit a recommendation request message to one or more member IoT devices in an IoT group that includes the IoT device, wherein the recommendation request message indicates a planned state transition;
receive one or more responses to the recommendation request message, wherein the one or more responses include feedback about the planned state transition from the member IoT devices responding to the recommendation request message; and
determine whether to initiate the planned state transition based on the responses to the recommendation request message.

19. A method for collaborative decision-making among Internet of Things (IoT) devices in an IoT group, comprising:
receiving a recommendation request message from at least one member IoT device in the IoT group, wherein the recommendation request message indicates a planned state transition associated with the at least one member IoT device;
determining a response to the recommendation request message based at least in part on feedback about the planned state transition; and
receiving an advertised final decision indicating whether the planned state transition will be initiated from the at least one member IoT device, wherein the at least one member IoT device generates the final decision based at least in part on the feedback about the planned state transition.

20. The method recited in claim 19, wherein the response to the recommendation request message includes a Boolean value to indicate whether the planned state transition is approved or disapproved.

21. The method recited in claim 19, wherein the response to the recommendation request message includes a fuzzy logic value to indicate a degree to which the planned state transition is approved or disapproved.

22. The method recited in claim 19, wherein determining the response to the recommendation request message comprises:
    analyzing a potential impact associated with the planned state transition based on a dependency tree that describes relationships among the member IoT devices in the IoT group; and
    determining the response to the recommendation request message based at least in part on the potential impact, wherein the determined response indicates whether the planned state transition is approved or disapproved.

23. The method recited in claim 19, wherein determining the response to the recommendation request message comprises:
    ignoring the recommendation request message without transmitting the feedback to the at least one member IoT device in response to having no opinion about whether to approve or disapprove the planned state transition.

24. The method recited in claim 19, wherein determining the response to the recommendation request message comprises:
    designating a proxy member IoT device to determine whether to approve or disapprove the planned state transition and transmit the response to the recommendation request message to the at least one member IoT device.

25. The method recited in claim 19, further comprising:
    receiving an unsolicited recommendation from the at least one member IoT device, wherein the unsolicited recommendation indicates an operational state associated with the at least one member IoT device; and
    planning one or more state transitions using a local decision-making algorithm to avoid a potential adverse impact on the operational state associated with the at least one member IoT device that sent the unsolicited recommendation.

\* \* \* \* \*